United States Patent
Wu

(10) Patent No.: US 11,418,996 B2
(45) Date of Patent: Aug. 16, 2022

(54) OPERATION CONTROL METHOD, MOBILE COMMUNICATIONS TERMINAL, AND NETWORK-SIDE DEVICE

(71) Applicant: VIVO MOBILE COMMUNICATION CO., LTD., Guangdong (CN)

(72) Inventor: Yumin Wu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 13 days.

(21) Appl. No.: 17/092,087

(22) Filed: Nov. 6, 2020

(65) Prior Publication Data

US 2021/0058817 A1    Feb. 25, 2021

Related U.S. Application Data

(63) Continuation of application No. PCT/CN2019/084495, filed on Apr. 26, 2019.

(30) Foreign Application Priority Data

May 7, 2018 (CN) .......................... 201810428587.4

(51) Int. Cl.
*H04W 28/02* (2009.01)
*H04W 72/12* (2009.01)

(52) U.S. Cl.
CPC ... *H04W 28/0257* (2013.01); *H04W 72/1289* (2013.01)

(58) Field of Classification Search
None
See application file for complete search history.

(56) References Cited

U.S. PATENT DOCUMENTS

| 2011/0038333 | A1  | 2/2011 | Yi et al. |
| 2012/0057547 | A1  | 3/2012 | Löhr et al. |
| 2013/0242897 | A1* | 9/2013 | Meylan ............... H04L 5/001 370/329 |

(Continued)

FOREIGN PATENT DOCUMENTS

| CN | 102415187 A | 4/2012 |
| CN | 102474874 A | 5/2012 |

(Continued)

OTHER PUBLICATIONS

EP Search Report in Application No. 19800065.5 dated Jun. 9, 2021.

(Continued)

*Primary Examiner* — Kodzovi Acolatse
(74) *Attorney, Agent, or Firm* — Maschoff Brennan

(57) ABSTRACT

This disclosure provides an operation control method, a mobile communications terminal, and a network-side device. The method applied to the mobile communications terminal includes: receiving logical channel prioritization (LCP) restriction configuration signaling sent by a network-side device, where the LCP restriction configuration signaling carries LCP restriction rules; and performing a management operation on a target LCP restriction rule in the LCP restriction rules, where the management operation is a deactivate operation or an activate operation.

18 Claims, 5 Drawing Sheets

(56) References Cited

U.S. PATENT DOCUMENTS

| | | | |
|---|---|---|---|
| 2014/0056278 A1* | 2/2014 | Marinier | H04W 72/044 |
| | | | 370/330 |
| 2016/0226632 A1* | 8/2016 | Zhang | H04L 1/1887 |
| 2019/0159229 A1* | 5/2019 | Yi | H04W 72/14 |
| 2019/0253924 A1* | 8/2019 | Kim | H04W 28/0278 |
| 2021/0037595 A1* | 2/2021 | Jin | H04W 80/02 |
| 2021/0051718 A1* | 2/2021 | Bhattad | H04W 72/14 |
| 2021/0136793 A1* | 5/2021 | Jiang | H04W 72/042 |
| 2021/0176696 A1* | 6/2021 | Sebire | H04L 5/0091 |
| 2021/0336732 A1* | 10/2021 | Shi | H04W 28/12 |
| 2021/0392664 A1* | 12/2021 | Alabbasi | H04W 72/1268 |

FOREIGN PATENT DOCUMENTS

| | | |
|---|---|---|
| WO | 2016/122814 A1 | 8/2016 |
| WO | 2017/171912 A1 | 10/2017 |
| WO | 2017/196099 A1 | 11/2017 |

OTHER PUBLICATIONS

Written Opinion and International Search report in Application No. PCT/CN2019/084495 dated Nov. 19, 2019.

* cited by examiner

OPERATION CONTROL METHOD, MOBILE COMMUNICATIONS TERMINAL, AND NETWORK-SIDE DEVICE

CROSS-REFERENCE TO RELATED APPLICATIONS

This application is a continuation application of International Application No. PCT/CN2019/084495 filed on Apr. 26, 2019, which claims priority to Chinese Patent Application No. 201810428587.4 filed in China on May 7, 2018, both disclosures of which are incorporated herein by reference in their entireties.

TECHNICAL FIELD

This disclosure relates to the field of communications technologies, and in particular, to an operation control method, a mobile communications terminal, and a network-side device.

BACKGROUND

A process in which a mobile communications terminal performs LCP (Logical Channel Prioritization, logical channel prioritization) is as follows: When an uplink grant is used for new data transmission, a network-side device configures an LCP restriction (namely, LCP restriction) rule by using RRC (Radio Resource Control, Radio Resource Control) signaling. Based on this rule, it may be determined whether the uplink grant can be used by a logical channel, so as to select a logical channel satisfying an uplink grant use condition to participate in allocation of the uplink grant.

Further, based on QoS (Quality of Service, quality of service) requirements of different logical channels, the network-side device configures logical channel priority parameters, namely LCP parameters, for different channels by using RRC signaling, so that the mobile communications terminal can allocate the uplink grant to a higher-priority logical channel when Bj of the higher-priority logical channel is greater than 0.

However, a state of the LCP restriction rule of the mobile communications terminal has a defect of relatively low flexibility.

SUMMARY

Some embodiments of this disclosure provide an operation control method, a mobile communications terminal, and a network-side device, so as to resolve a problem that a state of an LCP restriction rule of a related mobile communications terminal has a defect of relatively low flexibility.

In order to resolve the foregoing problem, this disclosure is implemented as follows:

According to a first aspect, some embodiments of this disclosure provide an operation control method, applied to a mobile communications terminal. The method includes:

receiving logical channel prioritization LCP restriction configuration signaling sent by a network-side device, where the LCP restriction configuration signaling carries LCP restriction rules; and performing a management operation on a target LCP restriction rule in the LCP restriction rules, where the management operation is a deactivate operation or an activate operation.

According to a second aspect, some embodiments of this disclosure provide an operation control method, applied to a network-side device. The method includes:

sending logical channel prioritization LCP restriction configuration signaling to a mobile communications terminal, where the LCP restriction configuration signaling carries LCP restriction rules; and sending operation control information to the mobile communications terminal, where the operation control information is used by the mobile communications terminal to determine a target LCP restriction rule in the LCP restriction rules and a management operation to be performed on the target LCP restriction rule, and the management operation is a deactivate operation or an activate operation.

According to a third aspect, some embodiments of this disclosure further provide a mobile communications terminal. The mobile communications terminal includes:

a first receiving module, configured to receive logical channel prioritization LCP restriction configuration signaling sent by a network-side device, where the LCP restriction configuration signaling carries LCP restriction rules; and an execution module, configured to perform a management operation on a target LCP restriction rule in the LCP restriction rules, where the management operation is a deactivate operation or an activate operation.

According to a fourth aspect, some embodiments of this disclosure further provide a network-side device. The network-side device includes:

a first sending module, configured to send logical channel prioritization LCP restriction configuration signaling to a mobile communications terminal, where the LCP restriction configuration signaling carries LCP restriction rules; and a second sending module, configured to send operation control information to the mobile communications terminal, where the operation control information is used by the mobile communications terminal to determine a target LCP restriction rule in the LCP restriction rules and a management operation to be performed on the target LCP restriction rule, and the management operation is a deactivate operation or an activate operation.

According to a fifth aspect, some embodiments of this disclosure further provide a mobile communications terminal. The mobile communications terminal includes: a processor, a memory, and a computer program stored in the memory and capable of running on the processor, where when the computer program is executed by the processor, the steps of the foregoing operation control method applied to the mobile communications terminal are implemented.

According to a sixth aspect, some embodiments of this disclosure further provide a network-side device. The network-side device includes: a processor, a memory, and a computer program stored in the memory and capable of running on the processor, where when the computer program is executed by the processor, the steps of the foregoing operation control method applied to the network-side device are implemented.

According to a seventh aspect, some embodiments of this disclosure further provide a computer-readable storage medium, where the computer-readable storage medium stores a computer program, and when the computer program is executed by a processor, the steps of the foregoing operation control method applied to the mobile communications terminal are implemented, or the steps of the foregoing operation control method applied to the network-side device are implemented.

In some embodiments of this disclosure, the logical channel prioritization LCP restriction configuration signaling sent by the network-side device is received, where the LCP restriction configuration signaling carries LCP restriction rules. The management operation is performed on the target LCP restriction rule in the LCP restriction rules, where the management operation is a deactivate operation or an activate operation. It can be learned that the mobile communications terminal can dynamically change the state of the target LCP restriction rule, thereby improving flexibility in adjusting the state of the target LCP restriction rule by the mobile communications terminal.

BRIEF DESCRIPTION OF DRAWINGS

To describe the technical solutions in some embodiments of this disclosure more clearly, the following briefly describes the accompanying drawings required for describing some embodiments of this disclosure. Apparently, the accompanying drawings in the following description merely show some embodiments of this disclosure, and a person of ordinary skill in the art can derive other embodiments from these accompanying drawings without creative efforts.

DESCRIPTION OF EMBODIMENTS

The following clearly describes the technical solutions in some embodiments of this disclosure with reference to the accompanying drawings in some embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

An operation control method, a mobile communications terminal, and a network-side device provided in some embodiments of this disclosure may be applied to a wireless communication system. The wireless communications system may be a 5G system, or an eLTE (Evolved Long Term Evolution, evolved long term evolution) system, or a subsequent evolved communications system.

Figure 1:
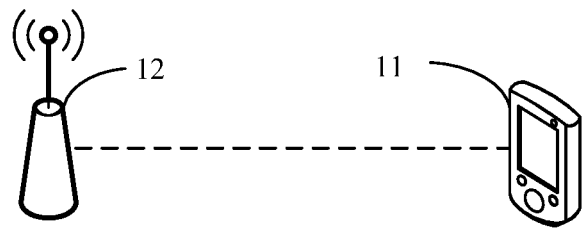
FIG. 1 is a schematic architectural diagram of a wireless communications system according to some embodiments of this disclosure.

Referring to FIG. 1, FIG. 1 is a schematic architectural diagram of a wireless communications system according to some embodiments of this disclosure. As shown in FIG. 1, the wireless communications system may include a mobile communications terminal 11 and a network-side device 12. The mobile communications terminal 11 may be connected to and communicate with the network-side device 12 through a network. In practical application, connection between the mobile communications terminal 11 and the network-side device 12 may be wireless connection. In order to conveniently and intuitively represent a connection relationship between the mobile communications terminal 11 and the network-side device 12, a dashed line is used in FIG. 1.

The mobile communications terminal 11 may be understood as user equipment (User Equipment, UE for short). Specifically, the mobile communications terminal 11 may be a mobile phone, a tablet computer (Tablet Personal Computer), a laptop computer (Laptop Computer), a personal digital assistant (personal digital assistant, PDA for short), a mobile Internet device (Mobile Internet Device, MID), a wearable device (Wearable Device), or the like.

The network-side device may be a NodeB (NodeB, NB for short), or may be an evolved NodeB (evolved Node B, eNB or eNodeB for short) in an LTE (Long Term Evolution, Long Term Evolution) system, or a relay station or an access point, or a gNB (gNB for short) in a 5G network, or a wireless network controller on a network side, which is not limited herein.

It should be noted that the wireless communications system may include a plurality of mobile communications terminals, and the network-side device may be connected to and communicate with the plurality of mobile communications terminals, such as transmitting signaling or data.

The following describes the operation control method according to some embodiments of this disclosure.

Figure 2:
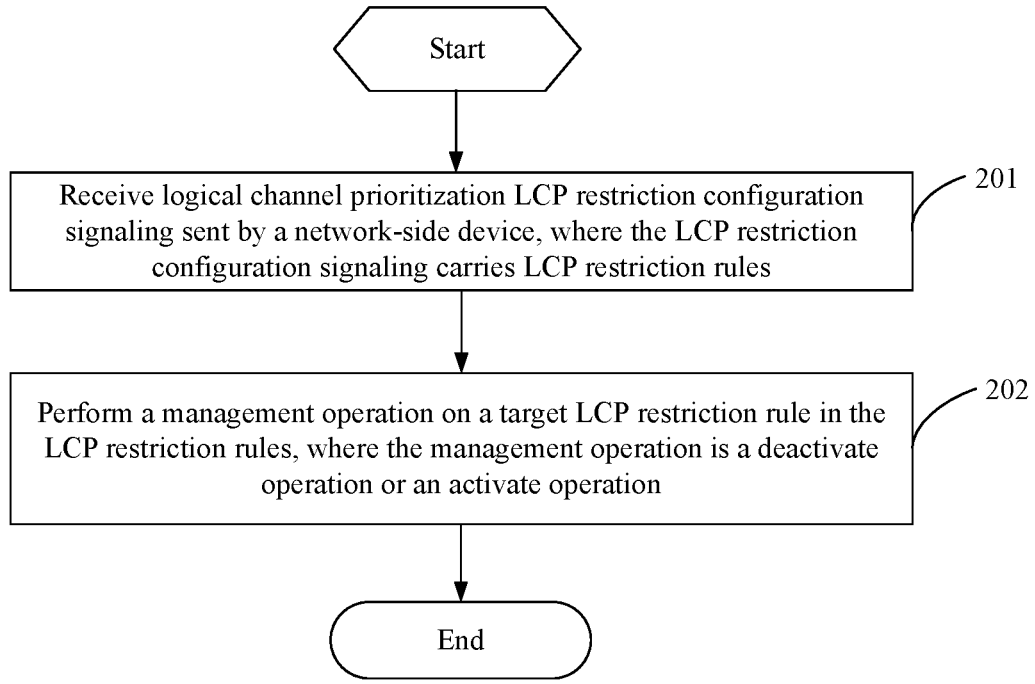
FIG. 2 is a flowchart 1 of an operation control method according to some embodiments of this disclosure.

Referring to FIG. 2, FIG. 2 is a flowchart 1 of an operation control method according to some embodiments of this disclosure. The operation control method in this embodiment may be applied to UE, and as shown in FIG. 1, includes the following steps.

Step 201: Receive logical channel prioritization LCP restriction configuration signaling sent by a network-side device, where the LCP restriction configuration signaling carries LCP restriction rules.

In this embodiment, LCP (Logical Channel Prioritization, logical channel prioritization) restriction configuration signaling may be referred to as RRC (Radio Resource Control, radio resource control) signaling.

The LCP restriction rule is used to configure LCP restriction for uplink grant allocation of logical channels. In this embodiment, the LCP restriction rule may correspond to one or more logical channels.

In this embodiment, each LCP restriction rule may include one or more of the following parameters:

an SCS (Sub-Carrier Spacing, sub-carrier spacing) list such as allowed SCS-List (which may be interpreted as an available SCS list);

PUSCH (Physical Uplink Shared Channel, physical uplink shared channel) duration such as max PUSCH-Duration (which may be interpreted as maximum PUSCH duration), indicating that PUSCH transmission duration corresponding to an available uplink grant for a logical channel needs to be less than or equal to the configured PUSCH duration, that is, max PUSCH-Duration;

a grant type allowed for a logical channel, which may include but is not limited to at least one of configured grant type 1 or configured grant type 2, for example, configured Grant Allowed (which may be interpreted as an available configured grant), which may include both configured grant type 1 and configured grant type 2; configured Grant Type1 Allowed (which may be interpreted as available configured grant type 1); configured Grant Type2 Allowed (which may be interpreted as available configured grant type 2); and a cell identity list such as allowed Serving Cells (which may be interpreted as available serving cells).

In this way, based on a parameter in an LCP restriction rule corresponding to a logical channel and a configuration parameter of a to-be-allocated uplink grant, the UE may determine whether the logical channel can use the uplink grant. Specifically, any one or a combination of the following conditions can be used for presentation:

whether an SCS of the uplink grant is included in an SCS list included in the LCP restriction rule corresponding to the logical channel;

whether PUSCH duration of the uplink grant is included in PUSCH duration included in the LCP restriction rule corresponding to the logical channel;

whether a type of the uplink grant is a grant type allowed for the logical channel; and whether a cell corresponding to the uplink grant is in cells corresponding to a cell identity list that is included in the LCP restriction rule corresponding to the logical channel.

Specifically, if one of the foregoing conditions holds true, it can be determined that the logical channel can use the uplink grant; otherwise, it can be determined that the logical channel cannot use the uplink grant.

In addition, it should be understood that the grant type may include at least one of configured grant type 1 or configured grant type 2.

In specific embodiments of this disclosure, a state (activated state or deactivated state) of the LCP restriction rule may be subsequently changed. When the network-side device delivers these LCP restriction rules for the first time, it can alternatively initialize some or all of these LCP restriction rules, to reduce times of changing the states of the LCP restriction rules later.

The LCP restriction rule to be initialized may be any one or more of LCP restriction rules carried in the LCP restriction configuration signaling, or may be the first LCP restriction rule in the LCP restriction rules carried in the LCP restriction configuration signaling, or may be an LCP restriction rule, corresponding to most logical channels, in the LCP restriction rules carried in the LCP restriction configuration signaling, which is not limited thereto.

In some implementations, optionally, the UE may obtain an LCP restriction rule configured by the network-side device or protocol-defined as initially available in the LCP restriction rules carried in the LCP restriction configuration signaling, so as to initialize some or all of the LCP restriction rules carried in the LCP restriction configuration signaling.

Optionally, after the receiving logical channel prioritization LCP restriction configuration signaling sent by a network-side device, and before the performing a management operation on a target LCP restriction rule in the LCP restriction rules, the method further includes:

activating an LCP restriction rule preconfigured as initially available in the LCP restriction rules carried in the LCP restriction configuration signaling; or deactivating an LCP restriction rule not preconfigured as initially available in the LCP restriction rules carried in the LCP restriction configuration signaling.

The initially available LCP restriction rule is configured by the network-side device or protocol-defined.

In specific implementation, for the LCP restriction rule preconfigured as initially available in the LCP restriction rules carried in the LCP restriction configuration signaling, the UE may immediately use the initially available LCP restriction rule. For the LCP restriction rule not preconfigured as initially available in the LCP restriction rules carried in the LCP restriction configuration signaling, the UE may discard the LCP restriction rule not preconfigured as initially available.

For example, if the initially available LCP restriction rule includes an LCP restriction rule 1, the UE may activate the LCP restriction rule 1. If the initially available LCP restriction rule does not include an LCP restriction rule 2, the UE may deactivate the LCP restriction rule 2.

The initially available LCP restriction rule may be protocol-defined, that is, be predefined in the protocol. For example, the system may directly solidify the initially available LCP restriction rule in a communication protocol between the network-side device and the UE. In this way, a terminal may directly read the initially available LCP restriction rule from the communication protocol, and then perform different operations on the LCP restriction rules carried in the LCP restriction configuration signaling, without the need to determine, according to an instruction of a network-side device, an operation type corresponding to each LCP restriction rule carried in the LCP restriction configuration signaling, thereby reducing system overheads.

Certainly, the initially available LCP restriction rule may alternatively be configured by the network-side device, to improve flexibility in configuring the operation type corresponding to each LCP restriction rule carried in the LCP restriction configuration signaling, different from the initially available LCP restriction rule predefined in the protocol.

Further, when the initially available LCP restriction rule is configured by the network-side device, the initially available LCP restriction rule may be carried in the LCP restriction configuration signaling, so that signaling overheads can be reduced compared with being carried in other signaling.

This improves flexibility of initial use states of the LCP restriction rules carried in the LCP restriction configuration signaling, compared to some implementations in which, after receiving the LCP restriction configuration signaling sent by the network-side device, the UE directly activates all the LCP restriction rules carried in the LCP restriction configuration signaling.

Step 202: Perform a management operation on a target LCP restriction rule in the LCP restriction rules, where the management operation is a deactivate operation or an activate operation.

The performing an activate operation on the target LCP restriction rule in the LCP restriction rules may be understood as: activating, by the UE, LCP restriction configuration of the logical channel corresponding to the target LCP restriction rule.

Correspondingly, the performing a deactivate operation on the target LCP restriction rule in the LCP restriction rules may be understood as: deactivating, by the UE, LCP restriction configuration of the logical channel corresponding to the target LCP restriction rule.

Further, when the LCP restriction configuration of the logical channel corresponding to the target LCP restriction rule is activated, the UE can use the activated LCP restriction configuration to select a logical channel for a received uplink grant.

For example, when the target LCP restriction rule corresponds to a logical channel 1, and LCP restriction configuration activated for the logical channel 1 includes an allowed SCS of 15 kHz of an uplink grant, the logical channel 1 is allowed to use the uplink grant with the SCS of 15 kHz, that is, the UE may allocate an uplink grant with an allowed SCS of 15 kHz to the logical channel 1 whose configured SCS list includes 15 kHz.

When the LCP restriction configuration of the logical channel corresponding to the target LCP restriction rule is deactivated, the UE may not use the deactivated LCP restriction configuration to select the logical channel for a received uplink grant.

For example, the target LCP restriction rule corresponds to the logical channel 1, and the LCP restriction configuration deactivated for the logical channel 1 includes the SCS of 15 kHz for the uplink grant allowed for use. In this application scenario, if the logical channel 1 is also allowed to use an SCS of 60 kHz, the logical channel 1 is allowed to use an uplink grant with the SCS of 60 kHz, but cannot use the uplink grant with the SCS of 15 kHz.

Further, after the UE performs the management operation on the target LCP restriction rule in the LCP restriction rules, the UE may prioritize, based on LCP parameters of different logical channels configured in the LCP restriction rules, the uplink grant for new data transmission to a higher-priority logical channel when a Bj of the higher-priority logical channel is greater than 0.

The LCP parameters may be configured by the network-side device by using RRC signaling based on QoS (Quality of Service, quality of service) of different logical channels, such as a GBR (Guaranteed Bit speed, guaranteed bit rate).

In specific implementation, the LCP parameters may include but are not limited to:

a priority (priority), for example, priority=1;

a prioritized bit speed (prioritized Bit speed, PBR), for example, PBR=8 kiloBytes/s; and bucket Size Duration (bucket Size Duration, namely BSD), for example, BSD=100 ms.

A Bj value is maintained for each logical channel, where (Bj=PBR×T). T is an elapsed time. If PBR=8 kiloBytes/s, Bj is incremented by 8 kiloBytes per second. A maximum value of Bj is (PBR×BSD).

It should be understood that after allocating an uplink grant to a logical channel, the UE decrements Bj based on a size of the uplink grant allocated to the logical channel. For example, if Bj of a logical channel is 80 bytes and a size of an uplink grant assigned to the logical channel is 40 byte, then Bj of the logical channel is (80−40)=40 bytes after the uplink grant is allocated.

In the operation control method in this embodiment, the logical channel prioritization LCP restriction configuration signaling sent by the network-side device is received, where the LCP restriction configuration signaling carries the LCP restriction rules. The management operation is performed on the target LCP restriction rule in the LCP restriction rules, where the management operation is a deactivate operation or an activate operation. It can be learned that the mobile communications terminal can dynamically change the state of the target LCP restriction rule, thereby improving flexibility in adjusting the state of the target LCP restriction rule by the mobile communications terminal.

Further, efficiency and reliability of uplink data transmission of the UE can be improved. For example, when changing to a lower speed, the UE is allowed to use an uplink grant with a smaller SCS, so as to improve the uplink data transmission efficiency of the UE. When changing to a higher speed, the UE uses an uplink grant with a larger SCS, so as to improve reliability of uplink data of the UE.

In some embodiments of this disclosure, the UE may be triggered in a plurality of manners to perform the management operation on the target LCP restriction rule in the LCP restriction rules, which is specifically described below.

Implementation 1

Optionally, after the receiving logical channel prioritization LCP restriction configuration signaling sent by a network-side device, and before the performing a management operation on a target LCP restriction rule in the LCP restriction rules, the method further includes:

receiving operation control information sent by the network-side device, where the operation control information is used by the mobile communications terminal to determine the target LCP restriction rule and the management operation.

It should be understood that in this implementation, the operation control information may be direct management information, that is, used to directly indicate a target LCP restriction rule to be managed by the UE and a corresponding management operation; or may be indirect management information, that is, merely provided to the UE to determine a trigger condition for performing a management operation on a target LCP restriction rule, so that the UE determines a target LCP restriction rule and a corresponding management operation based on the trigger condition. The details are as follows:

Application Scenario 1

Optionally, the operation control information includes identification information indicating the target LCP restriction rule and operation type information indicating the management operation.

In this application scenario, the operation control information is represented as direct management information.

Based on a comparison result between a UE speed and a preset speed threshold and a comparison result between a measurement result and a preset measurement threshold, the network-side device may determine whether it is necessary to change the state of the target LCP restriction rule in the LCP restriction rules. When the state of the target LCP restriction rule in the LCP restriction rules needs to be changed, the network-side device sends the operation control information to the UE, so that the UE can be triggered to perform the management operation on the target LCP restriction rule in the LCP restriction rules.

Therefore, it can be understood that in this implementation, performing the control operation on the target LCP restriction rule in the LCP restriction rules by the UE is triggered by sending the operation control information by the network-side device, which is a passive trigger mode.

The operation control information carries the operation type information indicating the management operation. In specific implementation, when the operation type information of the management operation is an activate operation, the operation control information may be represented as an activation command. When the operation type information of the management operation is a deactivate operation, the operation control information may be represented as a deactivation command.

In some application scenarios, the operation type information indicating the management operation may be identified by a bit, for example, a 1-bit value 1 identifies an activate operation and a value 0 identifies a deactivate operation. Certainly, different multi-bit values may also be used to separately identify activation or deactivation, which is not limited herein.

In addition, in specific implementation, the identification information indicating the target LCP restriction rule may be, but is not limited to, any one or a combination of the following:

LCP restriction rule identifier, for example, LCP restriction rule 1; and logical channel identifier corresponding to a LCP restriction rule, such as LCH 1.

Optionally, the operation control information may be, but is not limited to, carried in a media access control control element (Medium Access Control Control Element, MAC CE for short) or a physical downlink control channel (Physical Downlink Control Channel, PDCCH for short).

For ease of understanding, also referring to FIG. 3, the operation control information being carried in the MAC CE is used as an example for description below.

Figure 3:
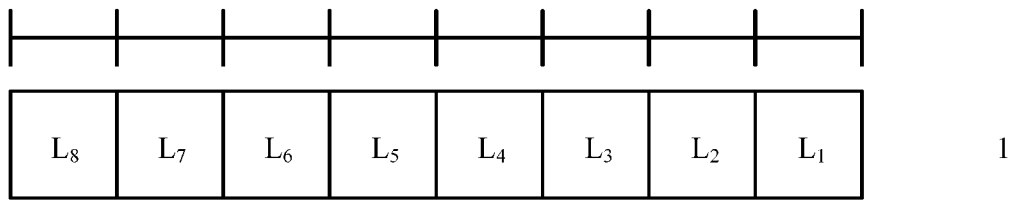
FIG. 3 is a schematic diagram of operation control information according to some embodiments of this disclosure.

In FIG. 3, Oct (octet, octet) 1 in the MAC CE is used as an example for description, where a Li field corresponds to an LCP restriction rule i. In specific implementation, if the Li field is set to "1", it indicates that the LCP restriction rule i corresponding to the field is activated; if the Li field is set to "0", it indicates that the LCP restriction rule i corresponding to the field is deactivated.

In this application scenario, the network-side device may send the operation control information to trigger the UE to perform the control operation on the target LCP restriction rule in the LCP restriction rules, so that the state of the target LCP restriction rule can be dynamically changed, thereby improving the flexibility in adjusting the state of the target LCP restriction rule by the mobile communications terminal.

Application Scenario 2

Optionally, the operation control information includes the trigger condition for performing the management operation on the target LCP restriction rule.

The performing the management operation on the target LCP restriction rule in the LCP restriction rules includes:

when the trigger condition holds true, performing the management operation on the target LCP restriction rule in the LCP restriction rules.

In this application scenario, when the trigger condition holds true, the UE actively performs the management operation on the target LCP restriction rule in the LCP restriction rules, which is an active trigger mode.

Optionally, the trigger condition is described by using at least one of a speed threshold or a measurement threshold.

The trigger condition for performing the management operation on the target LCP restriction rule may include a first trigger condition for performing the activate operation on the target LCP restriction rule and a second trigger condition for performing the deactivate operation on the target LCP restriction rule.

In specific implementation, when a speed of the UE exceeds the speed threshold, or a measurement result exceeds the measurement threshold, it may be considered that the first trigger condition holds true, and the UE may perform the activate operation on the target LCP restriction rule in the LCP restriction rules.

When the speed of the UE is lower than the speed threshold, or the measurement result is lower than the measurement threshold, it may be considered that the second trigger condition holds true, and the UE may perform the deactivate operation on the target LCP restriction rule in the LCP restriction rules.

It should be understood that the foregoing is merely an example, and does not constitute any limitation on correspondences between a first comparison result of the UE speed and the speed threshold, a second comparison result of the UE measurement result and the measurement threshold, the first trigger condition, and the second trigger condition in some embodiments of this disclosure. For example, in some application scenarios, when the UE speed exceeds the speed threshold, it may be considered that the trigger condition for performing the deactivate operation on the target LCP restriction rule by the UE holds true, which may be specifically set based on an actual requirement. This is not limited in some embodiments of this disclosure.

A measurement parameter corresponding to a measurement result may be used to evaluate channel quality, and a type of the measurement parameter may be any one or a combination of the following:

RSRP (Reference Symbol Received Power, reference symbol received power);

RSRQ (Reference Signal Received Quality, reference symbol received quality); and SINR (Signal to Interference and Noise Ratio, signal to interference and noise ratio).

Optionally, the operation control information is included in the LCP restriction configuration signaling, which reduces signaling overheads compared to being carried in other signaling.

In this application scenario, when the trigger condition holds true, the UE may independently perform the management operation on the target LCP restriction rule in the LCP restriction rules, so as to dynamically change the state of the target LCP restriction rule, thereby improving the flexibility in adjusting the state of the target LCP restriction rule by the mobile communications terminal.

In addition, the application scenario 1 is compared with the application scenario 2.

The application scenario 1 is a passive trigger mode. Although the network-side device needs to send additional signaling to instruct the UE to perform the management operation on the target LCP restriction rule, the network-side device can flexibly adjust a sending time, thereby improving configuration flexibility of the management operation.

The application scenario 2 is an active trigger mode. After obtaining the trigger condition, the UE may perform matching on a measurement parameter result of the UE and the trigger condition, and perform the management operation when the trigger condition corresponding to the management operation holds true. In this way, the network-side device does not need to send additional signaling to instruct the terminal to perform the management operation on the target LCP restriction rule, thereby reducing signaling overhead and saving system resources.

Implementation 2

Optionally, the performing a target operation on the target LCP restriction rule in the LCP restriction rules includes:

performing the target operation on the target LCP restriction rule in the LCP restriction rules when the trigger condition for performing the target operation on the target LCP restriction rule in the LCP restriction rules holds true.

The trigger condition is protocol-defined.

It should be understood that in this implementation, a trigger mode and implementation for performing the management operation on the target LCP restriction rule in the LCP restriction rules by the UE are the same as those in the application scenario 2 in Implementation 1. For details, reference may be made to the description of the application scenario 2 in Implementation 1, and details are not described herein again.

A difference between Implementation 2 and the application scenario 2 in Implementation 1 lies in that: the trigger condition for performing the target operation on the target LCP restriction rule in the LCP restriction rules in the application scenario 2 is configured by the network-side device, and the trigger condition for performing the target operation on the target LCP restriction rule in the LCP restriction rules in Implementation 2 is protocol-defined.

In this implementation, the trigger condition is protocol-defined, that is, the trigger condition is predefined in the protocol. For example, the system may directly solidify the trigger condition in the communication protocol between the network-side device and the UE. In this way, the terminal may directly read the trigger condition from the communication protocol, and then perform different operations on the LCP restriction rules carried in the LCP restriction configuration signaling, without the need to obtain the trigger condition based on an indication of the network-side device, so as to determine an operation type corresponding to each LCP restriction rule carried in the LCP restriction configuration signaling, thereby reducing system overheads.

In addition, the trigger condition in the application scenario 2 is configured by the network-side device. Therefore, compared with the protocol-defined trigger condition, the trigger condition in the application scenario 2 can be updated by the network-side device, thereby improving flexibility in determining the trigger condition.

It should be noted that various optional implementations described in some embodiments of this disclosure may be implemented in combination with each other or may be implemented independently, which is not limited in some embodiments of this disclosure.

Figure 4:
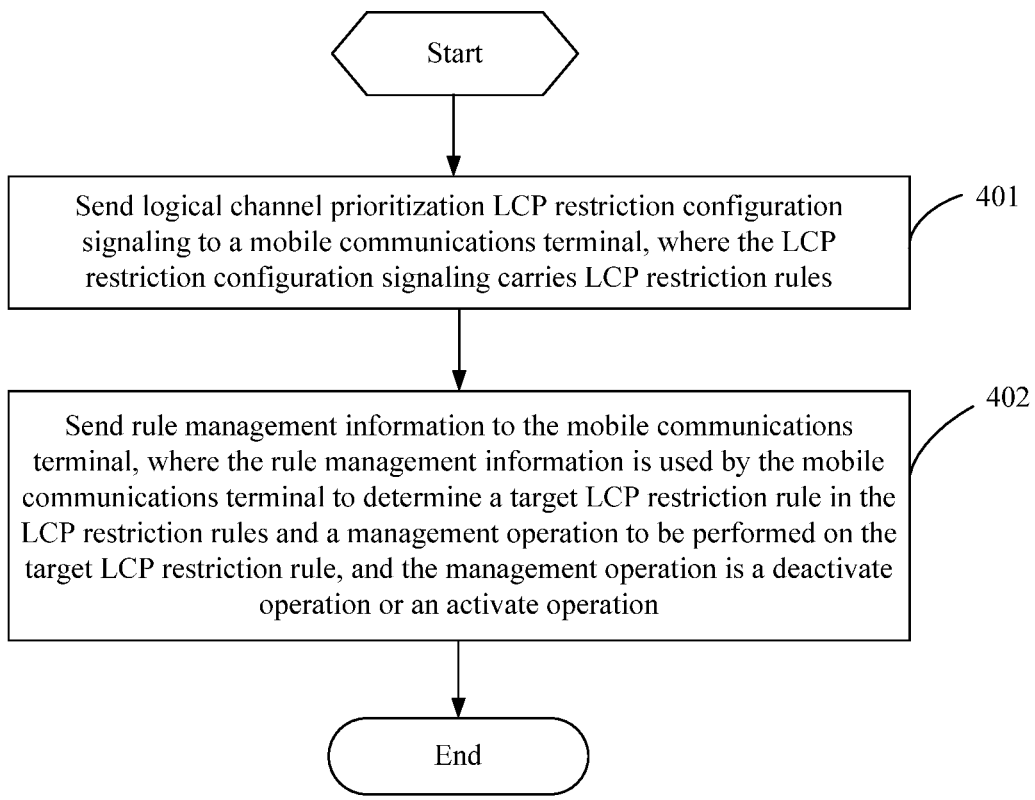
FIG. 4 is a flowchart 2 of an operation control method according to some embodiments of this disclosure.

Referring to FIG. 4, FIG. 4 is a flowchart 2 of an operation control method according to some embodiments of this disclosure. The operation control method in this embodiment may be applied to a network-side device, and as shown in FIG. 4, includes the following steps.

Step 401: Send logical channel prioritization LCP restriction configuration signaling to a mobile communications terminal, where the LCP restriction configuration signaling carries LCP restriction rules.

Step 402: Send operation control information to the mobile communications terminal, where the operation control information is used by the mobile communications terminal to determine a target LCP restriction rule in the LCP restriction rules and a management operation to be performed on the target LCP restriction rule, and the management operation is a deactivate operation or an activate operation.

Optionally, the operation control information includes identification information indicating the target LCP restriction rule and operation type information indicating the management operation.

Optionally, the operation control information is carried in the LCP restriction configuration signaling, and the operation control information includes a trigger condition for performing the management operation on the target LCP restriction rule.

It should be noted that this embodiment serves as an implementation of the network-side device corresponding to the foregoing method embodiment. Therefore, reference may be made to the related description in the foregoing method embodiment, and a same beneficial effect can be achieved. To avoid repetition, details are not described herein again.

Figure 5:
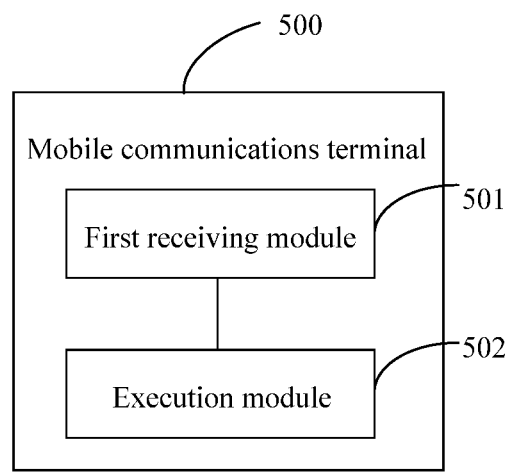
FIG. 5 is a structural diagram 1 of a mobile communications terminal according to some embodiments of this disclosure.

Referring to FIG. 5, FIG. 5 is a structural diagram 1 of a mobile communications terminal according to some embodiments of this disclosure. As shown in FIG. 5, a mobile communications terminal 500 includes a first receiving module 501 and an execution module 502.

The first receiving module 501 is configured to receive logical channel prioritization LCP restriction configuration signaling sent by a network-side device, where the LCP restriction configuration signaling carries LCP restriction rules.

The execution module 502 is configured to perform a management operation on a target LCP restriction rule in the LCP restriction rules, where the management operation is a deactivate operation or an activate operation.

On a basis of FIG. 5, the following describes modules further included in the mobile communications terminal 500 and units included in each module.

Optionally, the mobile communications terminal 500 further includes:

a second receiving module, configured to: after the logical channel prioritization LCP restriction configuration signaling sent by the network-side device is received and before the management operation is performed on the target LCP restriction rule in the LCP restriction rules, receive operation control information sent by the network-side device, where the operation control information is used by the mobile communications terminal to determine the target LCP restriction rule and the management operation.

Optionally, the operation control information includes identification information indicating the target LCP restriction rule and operation type information indicating the management operation.

Optionally, the operation control information is carried in a media access control control element or a physical downlink control channel.

Optionally, the operation control information includes a trigger condition for performing the management operation on the target LCP restriction rule.

The execution module 502 is specifically configured to:

when the trigger condition holds true, perform the management operation on the target LCP restriction rule in the LCP restriction rules.

Optionally, the operation control information is included in the LCP restriction configuration signaling.

Optionally, the trigger condition is described by using at least one of a speed threshold or a measurement threshold.

Optionally, the mobile communications terminal 500 further includes:

an activation module, configured to: after the logical channel prioritization LCP restriction configuration signaling sent by the network-side device is received and before the management operation is performed on the target LCP restriction rule in the LCP restriction rules, activate an LCP restriction rule preconfigured as initially available in the LCP restriction rules carried in the LCP restriction configuration signaling; or a deactivation module, configured to: after the logical channel prioritization LCP restriction configuration signaling sent by the network-side device is received and before the management operation is performed on the target LCP restriction rule in the LCP restriction rule, deactivate an LCP restriction rule not preconfigured as initially available in the LCP restriction rules carried in the LCP restriction configuration signaling.

The initially available LCP restriction rule is configured by the network-side device or protocol-defined.

The mobile communications terminal 500 can implement the processes in the method embodiment of this disclosure, with the same beneficial effects achieved. To avoid repetition, details are not described herein again.

Figure 6:
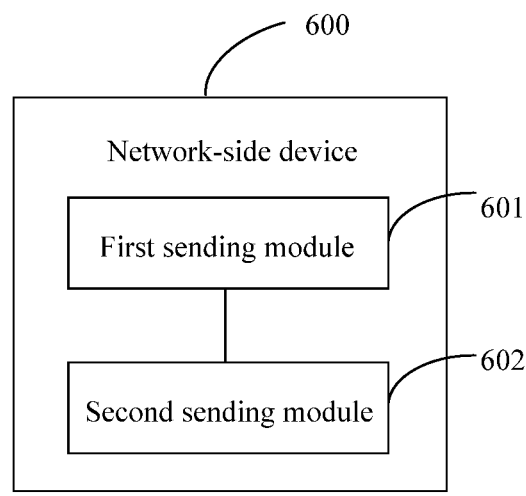
FIG. 6 is a structural diagram 1 of a network-side device according to some embodiments of this disclosure.

Referring to FIG. 6, FIG. 6 is a structural diagram 1 of a network-side device according to some embodiments of this disclosure. As shown in FIG. 6, a network-side device 600 includes a first sending module 601 and a second sending module 602.

The first sending module 601 is configured to send logical channel prioritization LCP restriction configuration signaling to a mobile communications terminal, where the LCP restriction configuration signaling carries LCP restriction rules.

The second sending module 602 is configured to send operation control information to the mobile communications terminal, where the operation control information is used by the mobile communications terminal to determine a target LCP restriction rule in the LCP restriction rules and a management operation to be performed on the target LCP restriction rule, and the management operation is a deactivate operation or an activate operation.

On a basis of FIG. 6, the following describes modules further included in the network-side device 600 and units included in each module.

Optionally, the operation control information includes identification information indicating the target LCP restriction rule and operation type information indicating the management operation.

Optionally, the operation control information is carried in the LCP restriction configuration signaling, and the operation control information includes a trigger condition for performing the management operation on the target LCP restriction rule.

The network-side device 600 can implement the processes in the method embodiment of this disclosure, with the same beneficial effects achieved. To avoid repetition, details are not described herein again.

Figure 7:
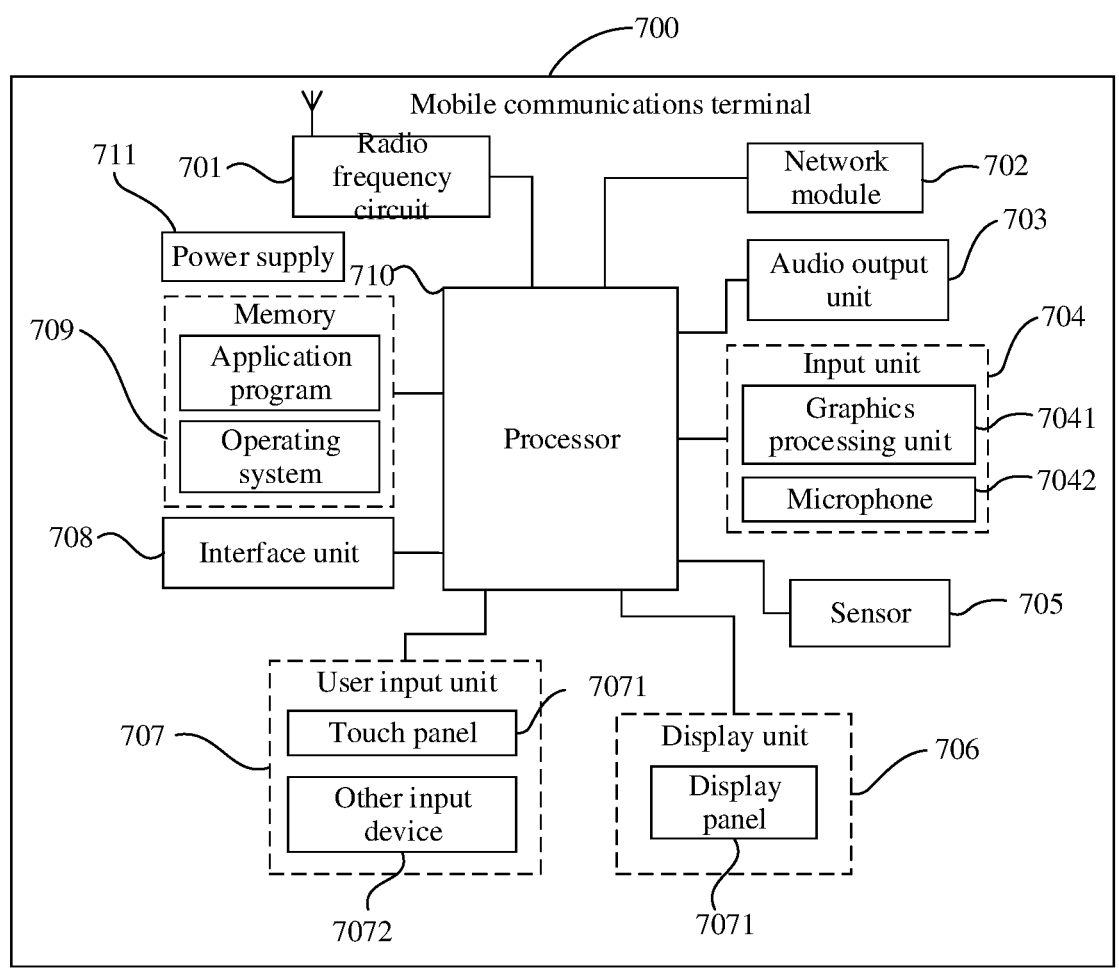
FIG. 7 is a structural diagram 2 of a mobile communications terminal according to some embodiments of this disclosure.

Referring to FIG. 7, FIG. 7 is a structural diagram 2 of a mobile communications terminal according to some embodiments of this disclosure. The mobile communications terminal may be a mobile communications terminal that implements the embodiments of this disclosure. As shown in FIG. 7, the mobile communications terminal 700 includes but is not limited to components such as a radio frequency circuit 701, a network module 702, an audio output unit 703, an input unit 704, a sensor 705, a display unit 706, a user input unit 707, an interface unit 708, a memory 709, a processor 710, a power supply 711, and the like. Persons skilled in the art can understand that a structure of the mobile communications terminal shown in FIG. 7 does not constitute any limitation on the mobile communications terminal, and the mobile communications terminal may include more or fewer components than those shown in the figure, or a combination of some components, or the components disposed differently. In some embodiments of this disclosure, the mobile communications terminal includes but is not limited to a mobile phone, a tablet computer, a laptop computer, a palmtop computer, an in-vehicle terminal, a wearable device, a pedometer, and the like.

The radio frequency circuit 701 is configured to:

receive logical channel prioritization LCP restriction configuration signaling sent by a network-side device, where the LCP restriction configuration signaling carries LCP restriction rules.

The processor 710 is configured to:

perform a management operation on a target LCP restriction rule in the LCP restriction rules, where the management operation is a deactivate operation or an activate operation.

Optionally, the radio frequency circuit 701 is further configured to:

receive operation control information sent by the network-side device, where the operation control information is used by the mobile communications terminal to determine the target LCP restriction rule and the management operation.

Optionally, the operation control information includes identification information indicating the target LCP restriction rule and operation type information indicating the management operation.

Optionally, the operation control information is carried in a media access control control element or a physical downlink control channel.

Optionally, the operation control information includes a trigger condition for performing the management operation on the target LCP restriction rule.

The processor 710 is further configured to:

when the trigger condition holds true, perform the management operation on the target LCP restriction rule in the LCP restriction rule.

Optionally, the operation control information is carried in the LCP restriction configuration signaling.

Optionally, the trigger condition is described by using at least one of a speed threshold or a measurement threshold.

Optionally, the processor 710 is further configured to:

activate an LCP restriction rule preconfigured as initially available in the LCP restriction rules carried in the LCP restriction configuration signaling; or deactivate an LCP restriction rule not preconfigured as initially available in the LCP restriction rules carried in the LCP restriction configuration signaling.

The initially available LCP restriction rule is configured by the network-side device or protocol-defined.

It should be noted that the foregoing mobile communications terminal 700 in this embodiment is capable of implementing the processes of the method embodiment in some embodiments of this disclosure, with the same beneficial effects achieved. To avoid repetition, details are not described herein again.

It should be understood that in some embodiments of this disclosure, the radio frequency circuit 701 may be configured to: receive and send signals in an information receiving/sending process or a call process; and specifically, after receiving downlink data from a base station, send the downlink data to the processor 710 for processing, and in addition, send uplink data to the base station. Generally, the radio frequency circuit 701 includes but is not limited to an antenna, at least one amplifier, a transceiver, a coupler, a low noise amplifier, a duplexer, and the like. In addition, the radio frequency circuit 701 may further communicate with a network and another device through a wireless communications system.

The mobile communications terminal provides a user with wireless broadband internet access through the network module 702, for example, helping the user to send or receive an e-mail, to browse a web page, or to access streaming media.

The audio output unit 703 may convert audio data received by the radio frequency circuit 701 or the network module 702 or stored in the memory 709 into an audio signal and output the audio signal as a sound. Furthermore, the audio output unit 703 may also provide audio output (for example, a call signal received sound or a message received sound) related to a specific function performed by the mobile communications terminal 700. The audio output unit 703 includes a speaker, a buzzer, a telephone receiver, and the like.

The input unit 704 is configured to receive an audio or video signal. The input unit 704 may include a graphics processing unit (Graphics Processing Unit, GPU) 7041 and a microphone 7042, and the graphics processing unit 7041 processes image data of a still picture or a video obtained by an image capture apparatus (for example, a camera) in an image capture mode or a video capture mode. A processed image frame may be displayed on the display unit 706. An image frame processed by the graphics processing unit 7041 may be stored in the memory 709 (or another storage medium) or sent by the radio frequency circuit 701 or the network module 702. The microphone 7042 can receive a sound and can process the sound into audio data. The processed audio data can be converted into a format that can be sent to a mobile communication base station through the radio frequency circuit 701 in a telephone call mode, for outputting.

The mobile communications terminal 700 may further include at least one sensor 705, for example, a light sensor, a motion sensor, and other sensors. Specifically, the light sensor may include an ambient light sensor and a proximity sensor. The ambient light sensor may adjust luminance of a display panel 7061 based on brightness of ambient light, and the proximity sensor can turn off the display panel 7061 and/or backlight when the mobile communications terminal 700 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the mobile communications terminal, functions related to vibration recognition (such as pedometer and tapping), and the like. The sensor 705 may also include a fingerprint sensor, a pressure sensor, an iris sensor, a molecular sensor, a gyroscope, a barometer, a hygrometer, a thermometer, an infrared sensor, and the like. Details are not described herein.

The display unit 706 is configured to display information input by the user or information provided for the user. The display unit 706 may include a display panel 7061, and the display panel 7061 may be configured in the form of a liquid crystal display (Liquid Crystal Display, LCD), an organic light-emitting diode (Organic Light-Emitting Diode, OLED), or the like.

The user input unit 707 may be configured to receive input digit or character information and generate key signal input related to user setting and function control of the mobile communications terminal. Specifically, the user input unit 707 includes a touch panel 7071 and other input devices 7072. The touch panel 7071, also referred to as a touchscreen, may capture a touch operation performed by the user on or near the touch panel (for example, an operation performed by the user on the touch panel 7071 or near the touch panel 7071 by using any appropriate object or accessory such as a finger or a stylus). The touch panel 7071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 710, and receives and executes a command sent by the processor 710. In addition, the touch panel 7071 may be implemented in a plurality of forms, for example, as a resistive, capacitive, infrared, or surface acoustic wave touch panel. The user input unit 707 may further include other input devices 7072 in addition to the touch panel 7071. Specifically, the other input devices 7072 may include but are not limited to a physical keyboard, a function key (such as a volume control key or a power on/off key), a trackball, a mouse, a joystick, and the like. Details are not described herein.

Further, the touch panel 7071 may cover the display panel 7061. After detecting a touch operation on or near the touch panel 7071, the touch panel 7071 transmits information about the touch operation to the processor 710 for the processor 710 to determine a touch event type, and then the processor 710 provides a corresponding visual output on the display panel 7061 based on the touch event type. Although in FIG. 7, the touch panel 7071 and the display panel 7061 act as two independent parts to implement input and output functions of the mobile communications terminal, in some embodiments, the touch panel 7071 and the display panel 7061 may be integrated to implement the input and output functions of the mobile communications terminal. This is not specifically limited herein.

The interface unit 708 is an interface between an external apparatus and the mobile communications terminal 700. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 708 may be configured to: receive input (for example, data information and power) from the external apparatus, and transmit the received input to one or more elements in the mobile communications terminal 700, or may be configured to transmit data between the mobile communications terminal 700 and the external apparatus.

The memory 709 may be configured to store a software program and various data. The memory 709 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 709 may include a high-speed random access memory, or may also include a non-volatile memory, for example, at least one magnetic disk storage device, a flash memory device, or other volatile solid-state storage devices.

The processor 710 is a control center of the mobile communications terminal, and is connected to all components of the mobile communications terminal by using various interfaces and lines. By running or executing a software program and/or module that is stored in the memory 709 and calling data stored in the memory 709, the processor 710 executes various functions of the mobile communications terminal and processes data, so as to perform overall monitoring on the mobile communications terminal. The processor 710 may include one or more processing units. Optionally, an application processor and a modem processor may be integrated into the processor 710. The application processor mainly processes an operating system, a user interface, an application program, and the like. The modem processor mainly processes wireless communication. It may be understood that the modem processor may alternatively not be integrated into the processor 710.

The mobile communications terminal 700 may further include a power supply 711 (for example, a battery) supplying power to all components. Optionally, the power supply 711 may be logically connected to the processor 710 through a power management system. In this way, functions such as charge management, discharge management, and power consumption management are implemented by using the power management system.

In addition, the mobile communications terminal 700 includes some functional modules that are not shown, details of which are not described herein.

Optionally, some embodiments of this disclosure further provide a mobile communications terminal, including: a processor 710, a memory 709, and a computer program stored in the memory 709 and capable of running on the processor 710. When the computer program is executed by the processor 710, processes in the foregoing embodiments of the operation control method are implemented, with the same technical effects achieved. To avoid repetition, details are not described herein again.

Figure 8:
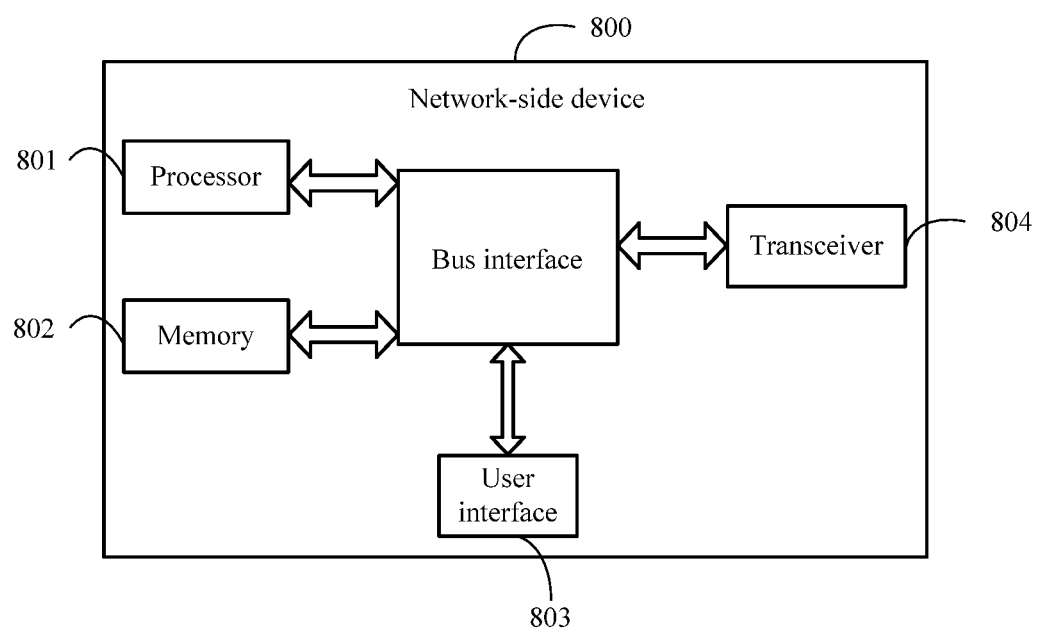
FIG. 8 is a structural diagram 2 of a network-side device according to some embodiments of this disclosure.

Referring to FIG. 8, FIG. 8 is a structural diagram 2 of a network-side device according to some embodiments of this disclosure. As shown in FIG. 8, the network-side device 800 includes a processor 801, a memory 802, a user interface 803, a transceiver 804, and a bus interface.

In some embodiments of this disclosure, the network-side device 800 further includes a computer program stored in the memory 802 and capable of running on the processor 801.

Optionally, the transceiver 804 is configured to:

send logical channel prioritization LCP restriction configuration signaling to a mobile communications terminal, where the LCP restriction configuration signaling carries LCP restriction rules; and send operation control information to the mobile communications terminal, where the operation control information is used by the mobile communications terminal to determine a target LCP restriction rule in the LCP restriction rules and a management operation to be performed on the target LCP restriction rule, and the management operation is a deactivate operation or an activate operation.

Optionally, the operation control information includes identification information indicating the target LCP restriction rule and operation type information indicating the management operation.

Optionally, the operation control information is carried in the LCP restriction configuration signaling, and the operation control information includes a trigger condition for performing the management operation on the target LCP restriction rule.

In FIG. 8, a bus architecture may include any quantity of interconnected buses and bridges, and specifically connects together circuits that are of one or more processors represented by the processor 801 and of a memory represented by the memory 802. The bus architecture may further connect together various other circuits such as a peripheral device, a voltage stabilizer, and a power management circuit. These are well known in the art, and therefore are not further described in this specification any more. The bus interface provides interfaces. The transceiver 804 may be a plurality of elements, including a transmitter and a receiver, and provides units for communicating with a variety of other apparatuses on a transmission medium. For different user equipments, the user interface 803 may also be an interface that can be externally or internally connected to a required device. The connected device includes but is not limited to a keypad, a display, a speaker, a microphone, a joystick, and the like.

The processor 801 is responsible for management of the bus architecture and general processing, and the memory 802 is capable of storing data that is used by the processor 801 during operation.

Optionally, when the computer program is executed by the processor 801, the following steps can further be implemented:

The network-side device 800 is capable of implementing the processes and beneficial effects implemented by the network-side device in the method embodiment. To avoid repetition, details are not described herein again.

Some embodiments of this disclosure further provide a computer-readable storage medium, where a computer program is stored in the computer-readable storage medium. When the computer program is executed by a processor, the processes in the foregoing embodiment of the operation control method applied to the mobile communications terminal or the processes in the foregoing embodiment of the operation control method applied to the network-side device are implemented, with the same technical effects achieved. To avoid repetition, details are not described herein again. The computer-readable storage medium may be a volatile computer-readable storage medium or a non-volatile computer-readable storage medium, such as a read-only memory (Read-Only Memory, ROM for short), a random access memory (Random Access Memory, RAM for short), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, the former is a more preferred implementation. Based on such an understanding, the technical solutions of this disclosure essentially, or the part contributing to the related art may be implemented in a form of a software product. The software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The foregoing describes the embodiments of this disclosure with reference to the accompanying drawings. However, this disclosure is not limited to the foregoing specific embodiments. The foregoing specific embodiments are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. An operation control method, applied to a mobile communications terminal and comprising:

receiving logical channel prioritization LCP restriction configuration signaling sent by a network-side device, wherein the LCP restriction configuration signaling carries LCP restriction rules; and performing a management operation on a target LCP restriction rule in the LCP restriction rules, wherein the management operation is a deactivate operation or an activate operation, wherein each LCP restriction rule is used to configure LCP restriction for uplink grant allocation of logical channels;

wherein after the receiving logical channel prioritization LCP restriction configuration signaling sent by a network-side device and before the performing a management operation on a target LCP restriction rule in the LCP restriction rules, the method further comprises:

receiving operation control information sent by the network-side device, wherein the operation control information is used by the mobile communications terminal to determine the target LCP restriction rule and the management operation.

2. The method according to claim 1, wherein the operation control information comprises identification information indicating the target LCP restriction rule and operation type information indicating the management operation.

3. The method according to claim 2, wherein the operation control information is carried in a media access control control element or a physical downlink control channel.

4. The method according to claim 1, wherein the operation control information comprises a trigger condition for performing the management operation on the target LCP restriction rule; and the performing a management operation on a target LCP restriction rule in the LCP restriction rules comprises:

when the trigger condition holds true, performing the management operation on the target LCP restriction rule in the LCP restriction rules.

5. The method according to claim 4, wherein the operation control information is carried in the LCP restriction configuration signaling.

6. The method according to claim 4, wherein the trigger condition is described by using at least one of a speed threshold or a measurement threshold.

7. The method according to claim 1, wherein after the receiving logical channel prioritization LCP restriction configuration signaling sent by a network-side device and before the performing a management operation on a target LCP restriction rule in the LCP restriction rules, the method further comprises:

activating an LCP restriction rule preconfigured as initially available in the LCP restriction rules carried in the LCP restriction configuration signaling; or deactivating an LCP restriction rule not preconfigured as initially available in the LCP restriction rules carried in the LCP restriction configuration signaling; wherein the initially available LCP restriction rule is configured by the network-side device or protocol-defined.

8. A non-transitory computer-readable storage medium, wherein the computer-readable storage medium stores a computer program, and the computer program is executed by a processor to implement the operation control method according to claim 1.

9. An operation control method, applied to a network-side device and comprising:

sending logical channel prioritization LCP restriction configuration signaling to a mobile communications terminal, wherein the LCP restriction configuration signaling carries LCP restriction rules; and after the sending the LCP restriction configuration signaling to the mobile communications terminal, sending operation control information to the mobile communications terminal, wherein the operation control information is used by the mobile communications terminal to determine a target LCP restriction rule in the LCP restriction rules and a management operation to be performed on the target LCP restriction rule, and the management operation is a deactivate operation or an activate operation, wherein each LCP restriction rule is used to configure LCP restriction for uplink grant allocation of logical channels.

10. The method according to claim 9, wherein the operation control information comprises identification information indicating the target LCP restriction rule and operation type information indicating the management operation; or the operation control information is carried in the LCP restriction configuration signaling, and the operation control information comprises a trigger condition for performing the management operation on the target LCP restriction rule.

11. A network-side device, comprising:

a processor, a memory, and a computer program stored in the memory and capable of running on the processor, wherein when the computer program is executed by the processor, the processor implements the steps of the operation control method according to claim 9.

12. A non-transitory computer-readable storage medium, wherein the computer-readable storage medium stores a computer program, and the computer program is executed by a processor to implement the operation control method according to claim 9.

13. A mobile communications terminal, comprising:

a radio frequency circuit, configured to receive logical channel prioritization LCP restriction configuration signaling sent by a network-side device, wherein the LCP restriction configuration signaling carries LCP restriction rules; and a processor, configured to perform a management operation on a target LCP restriction rule in the LCP restriction rules, wherein the management operation is a deactivate operation or an activate operation, wherein each LCP restriction rule is used to configure LCP restriction for uplink grant allocation of logical channels;

after the receiving logical channel prioritization LCP restriction configuration signaling sent by a network-side device and before the performing a management operation on a target LCP restriction rule in the LCP restriction rules, the radio frequency circuit is further configured to:

receive operation control information sent by the network-side device, wherein the operation control information is used by the mobile communications terminal to determine the target LCP restriction rule and the management operation.

14. The mobile communications terminal according to claim 13, wherein the operation control information comprises identification information indicating the target LCP restriction rule and operation type information indicating the management operation.

15. The mobile communications terminal according to claim 14, wherein the operation control information is carried in a media access control control element or a physical downlink control channel.

16. The mobile communications terminal according to claim 13, wherein the operation control information comprises a trigger condition for performing the management operation on the target LCP restriction rule; and the processor is further configured to:

when the trigger condition holds true, perform the management operation on the target LCP restriction rule in the LCP restriction rules.

17. The mobile communications terminal according to claim 16, wherein the operation control information is carried in the LCP restriction configuration signaling; and/or the trigger condition is described by using at least one of a speed threshold or a measurement threshold.

18. The mobile communications terminal according to claim 13, wherein the processor is further configured to:

activate an LCP restriction rule preconfigured as initially available in the LCP restriction rules carried in the LCP restriction configuration signaling; or deactivate an LCP restriction rule not preconfigured as initially available in the LCP restriction rules carried in the LCP restriction configuration signaling; wherein the initially available LCP restriction rule is configured by the network-side device or protocol-defined.

\* \* \* \* \*